Dec. 2, 1930.    J. A. BYINGTON    1,783,700
FRUIT GRADING TABLE
Filed July 12, 1929    2 Sheets-Sheet 1
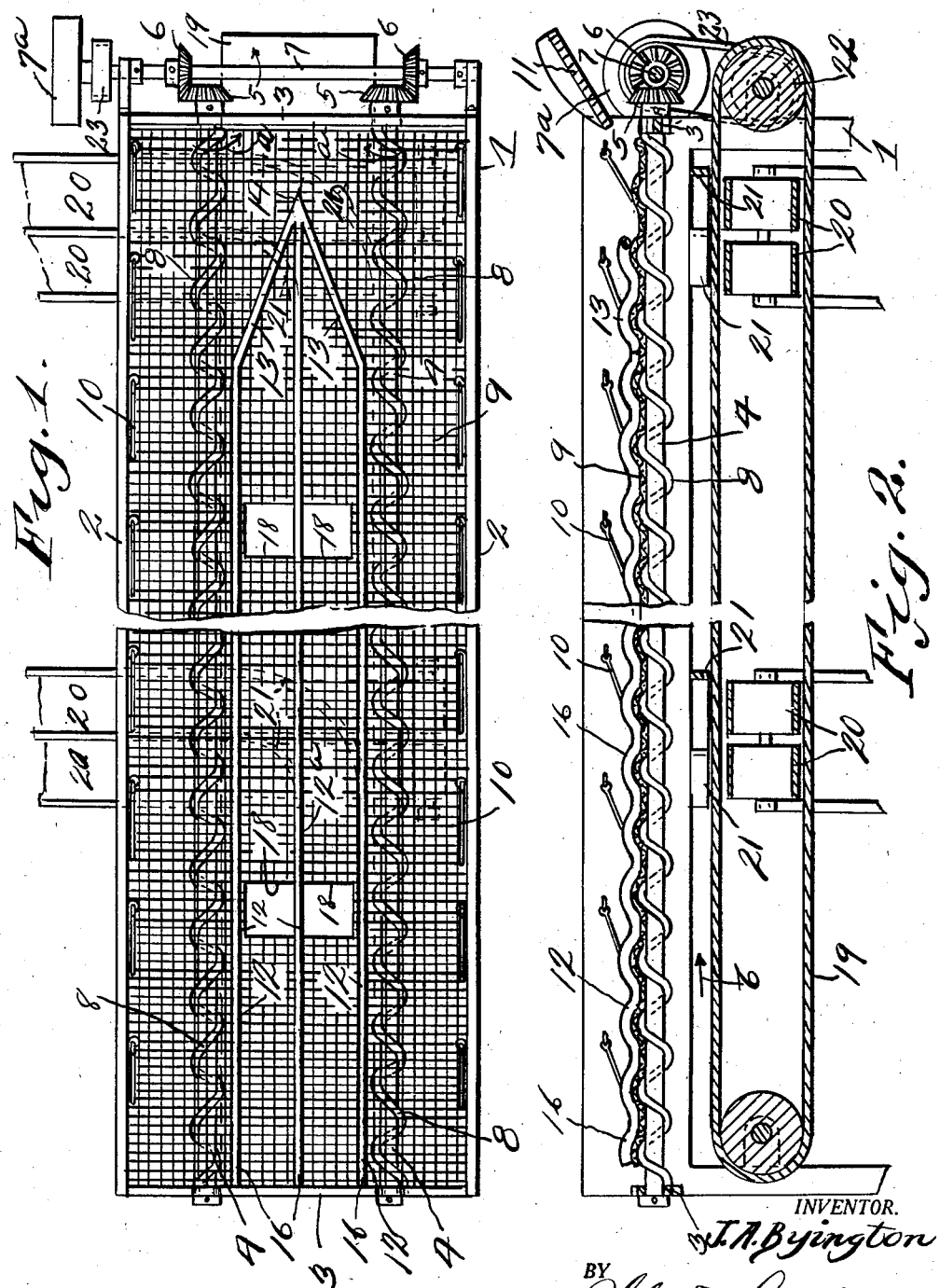
INVENTOR.
J. A. Byington
BY
ATTORNEY.

Dec. 2, 1930.  J. A. BYINGTON  1,783,700
FRUIT GRADING TABLE
Filed July 12, 1929   2 Sheets-Sheet 2

INVENTOR.
J. A. Byington
BY
ATTORNEY.

Patented Dec. 2, 1930

1,783,700

UNITED STATES PATENT OFFICE

JAMES AUGUSTUS BYINGTON, OF ORLANDO, FLORIDA

FRUIT-GRADING TABLE

Application filed July 12, 1929. Serial No. 377,870.

The invention relates to grading tables particularly of the type used in fruit packing houses but applicable to use in connection with any investment wherein a plurality of members which will roll are moved on the table past operators who distribute the same according to condition or size.

A further object is to provide a grading or assorting table particularly adapted for use in assorting oranges, grapefruit and other fruit or vegetables and comprising a flexible apron disposed within a frame and which apron has disposed beneath the same and cooperating with the under side thereof, means whereby waves are formed transversely in the flexible apron and advanced whereby fruit or vegetables on the apron will be caused to roll longitudinally of the apron past operators who pick therefrom fruit of different sizes and place the same in positions on the apron where the fruit will pass through discharge openings to distributing conveyors.

A further object is to secure to the upper side of the apron flexible deflecting members, which deflect articles moving over the apron at the intake end thereof to opposite sides of the apron where they can be easily reached for distribution.

A further object is to form the deflecting members from linked members, preferably covered, which will easily and quickly conform to the vertical longitudinal contour of the apron without interfering with the transverse flexing of the apron.

A further object is to provide a centrally disposed flexible deflecting member on the apron and dividing the discharge openings into two sides adjacent operators and forming means whereby a maximum number of operators may operate the device in the minimum amount of space.

A further object is to converge the forward ends of the deflecting member so as to form a V-shaped projection for dividing the fruit or vegetables conveyed by the waving operation to opposite sides of the apron, where they can be easily reached.

A further object is to provide rotatable rollers beneath the apron and extending longitudinally of the table and provided with spirals which engage the under side of the apron for waving the same transversely and when rotated advancing the waves throughout the apron. Also to provide means cooperating with the apron for holding the waves therein during the rotation of the spirals in engagement with the under side of the apron.

A further object is to rotate the spiral rollers in directions whereby they will frictionally act in opposed relation transversely on the flexible apron for counteracting the tendency of the spirals to force the apron against the sides of the frame.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the grading table.

Figure 2 is a vertical longitudinal sectional view through the table.

Figure 3:
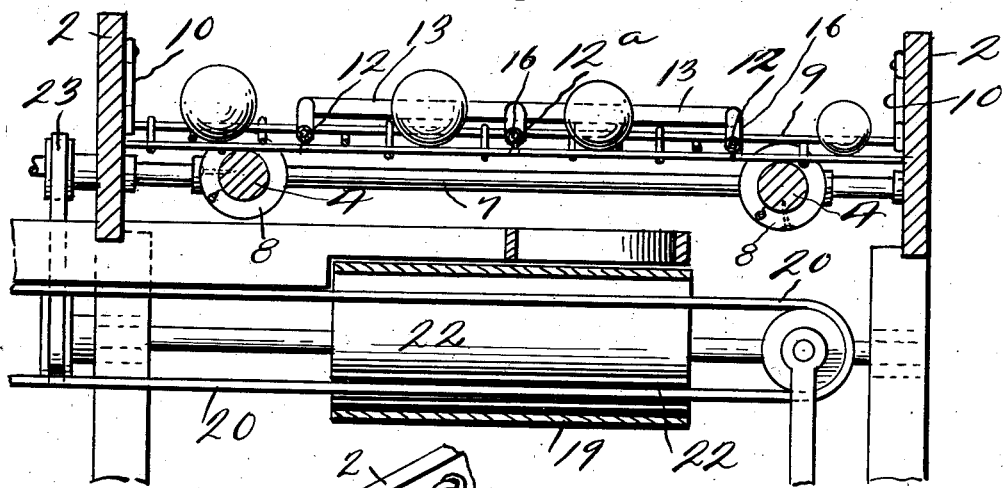
Figure 3 is a vertical transverse sectional view through the table.

Referring to the drawings, the numeral 1 designates the frame of the table which may be of any shape, and 2 the side members thereof. The ends of the side members 2 are provided with cross bars 3, in which are rotatably mounted the ends of the rollers 4, which rollers are preferably two in number.

Figure 4:
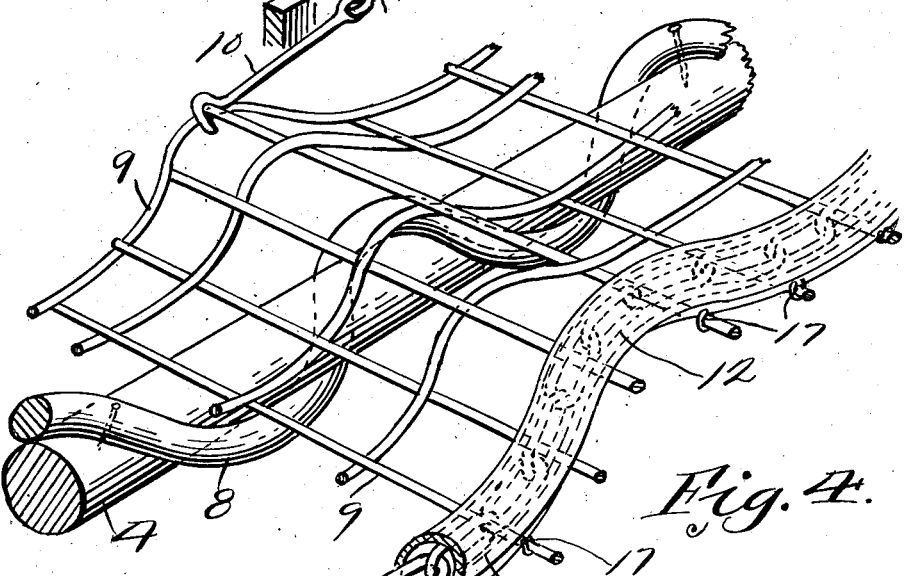
Figure 4 is an enlarged detail perspective view of a portion of the apron showing a portion of one of the flexible deflecting members.
Figure 5:
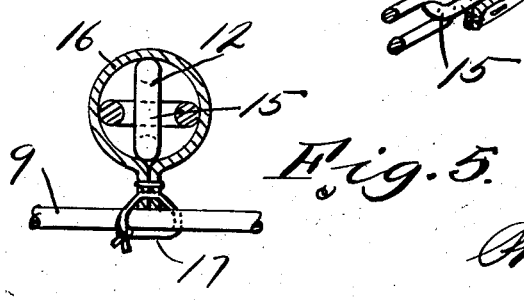
Figure 5 is a vertical transverse sectional view through one of the deflecting members.

The rollers 4 have one of their ends provided with bevelled gears 5, with which the bevelled gears 6 carried by the transverse drive shaft 7 mesh. It will be seen that when the shaft 7 is rotated by means of the pulley 7a, which may be belted to any source of power, the rollers 4 may be simultaneously rotated through the bevelled connections, and said rollers will rotate in opposite directions for instance in the direction of the arrow a, Figure 1, the purpose of which will presently appear. Rollers 4 are provided with spirals 8, which spirals are in opposed relation and engage the under side of the flexible screened apron 9, and support the apron with transverse waves therein, particularly when fruit is on the apron, and which waves are formed by the spirals 8 and depressions between the upper sides of the convolutions of the spirals, as clearly shown in Figure 2. The transverse waves are maintained in the apron 9 by the hooks 10, which hook into opposite sides of the apron as clearly shown in Figure 4, therefore it will be seen that the apron will not be straightened out incident to the rotation of the rollers 4 with their spirals 8 in engagement with the under side of the apron. The spirals 8 may be formed from any material, for instance wire or conventional rope, or if desired leather or turned as an integral portion of the rollers 4. Applicant does not limit himself in this particular. Any number of hooks may be used or any other holding means as applicant does not limit himself to this specific method; the hooks being shown as a preferred form of holding means. Fruit or other articles are fed onto the apron 9 by placing the same on a discharge trough or hopper 11.

Secured to the upper side of the apron in spaced relation to the side walls 2 of the frame are longitudinally disposed flexible members 12, which flexible members extend towards the feed end of the device and terminate in converging portions 13, connected together at 14. The flexible members 12 are preferably formed from linked members 15, for instance a chain, which chain may be provided with a cover 16 of canvas or other material, and which cover is connected at 17 to the apron 9, therefore it will be seen that as the apron 9 flexes, incident to the spirals 8, waving the same transversely, and advancing said waves, said flexible members will conform to the waving action of the apron. The members 12 and 16 form deflecting members for forcing and maintaining the fruit during their rolling movement towards the side members 2 of the frame, where it can be easily reached by the operators who select particular sizes and place the same between the members 12 and the flexible members 12a between the members 12, where the selected sizes will be conveyed to the discharge openings 18 in the apron, and through which openings the fruit will pass downwardly onto the longitudinal conveyor belt 19, which preferably moves in the direction of the arrow b, Figure 2, for distribution in any suitable manner to other fruit handling machinery or to packers over transverse belts 20, onto which fruit is deflected by the deflecting members 21. The belt 19 is driven from its roller 22 which is belted at 23 to the shaft 7, therefore it will be seen that a single source of power is utilized for operating a device.

From the above it will be seen that a grading table is provided on which articles may be graded, for instance fruit or vegetables, and the articles to be graded are conveyed longitudinally over a screen having a waving motion which advances throughout its length, thereby imparting a rolling action to the article, which rolling action is towards the operator as distinguished from a movement away from the operator, thereby facilitating the accurate grading of the fruit as to size, as the operator can easily distinguish inaccuracies in size and imperfections in fruit or vegetables when the article is rolling towards the operator as distinguished from a rotation away from the operator even though the article is approaching the operator. By providing a waving apron there is a positive rolling action, consequently the fruit is not damaged when moving over the table. The apron has sufficient flexibility whereby it will not sag with fruit thereon, therefore it can be easily supported on the two spiral rollers, and it will be noted by having the spirals in opposed relation as shown in Figure 1, and operating in opposite directions, for instance inwardly and downwardly, the apron will not be forced tightly against the sides 2, thereby binding the waving action, or interfering with a positive waving action.

The invention having been set forth what is claimed as new and useful is:—

1. A grading table comprising a frame, a flexible apron within said frame and spiral rollers cooperating with the under side of said apron, whereby transverse waves are imparted in said apron and advanced therein.

2. A grading table comprising a frame, a flexible apron within said frame and spiral rollers cooperating with the under side of said apron longitudinally thereof, whereby transverse waves are imparted in said apron and longitudinally advanced therein.

3. A grading table comprising a frame, a stationary flexible apron within said frame and spiral rollers cooperating with the underside of said apron longitudinally thereof and forming means whereby transverse waves are imparted in said apron and longitudinally advanced therein.

4. A grading table comprising a frame, a stationary flexible apron within said frame, spiral rollers cooperating with the underside of said apron longitudinally thereof and forming means whereby transverse waves are imparted to said apron and longitudinally advanced therein, and means cooperating with said apron for maintaining the transverse waves in the apron during the rotation of the rollers.

5. A grading table comprising a frame, a stationary flexible apron within said frame, spiral rollers cooperating with the under side of said apron longitudinally thereof and forming means whereby transverse waves are imparted to said apron and longitudinally advanced therein and hooked members pivotally mounted and cooperating with opposite sides of the apron for maintaining the wave therein during the rotation of the rollers.

6. A grading table comprising a frame, a stationary flexible apron within said frame and having fruit discharging openings therein, means for transversely waving and longitudinally moving waves in the apron, distributor means disposed below the openings in the apron and flexible members secured to the apron and projecting above the apron and forming means for deflecting articles to opposite sides of the apron.

7. A grading table comprising a frame, a stationary flexible apron within said frame and having fruit discharging openings therein, means for transversely and longitudinally moving waves in the apron, distributor means below the openings in the apron, flexible members secured to the apron spaced from opposite sides thereof and at opposite sides of the openings in the apron, said flexible members converging adjacent one end of the apron and a flexible member extending longitudinally between the first mentioned flexible member in spaced relation thereto.

8. The combination with a grading table apron, means for transversely imparting waves in the apron and advancing said waves, of article deflecting members secured to said apron and extending above the apron, said article deflecting members being formed whereby they will conform to the contour of the apron.

9. The combination with a grading table apron, means for transversely imparting waves in the apron and advancing said waves, of article deflecting members secured to said apron and extending above the apron, said deflecting members being formed from linked members.

In testimony whereof he hereunto affixes his signature.

JAMES AUGUSTUS BYINGTON.